Aug. 13, 1968   G. FAEHNDRICH ET AL   3,396,450
PROCESS FOR MAKING A UNIT CONSISTING OF A TIMEPIECE
SPIRAL AND A COLLET
Filed March 21, 1966   4 Sheets-Sheet 1

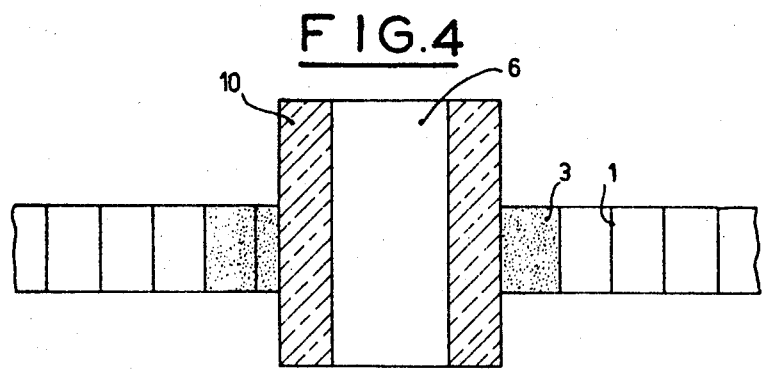
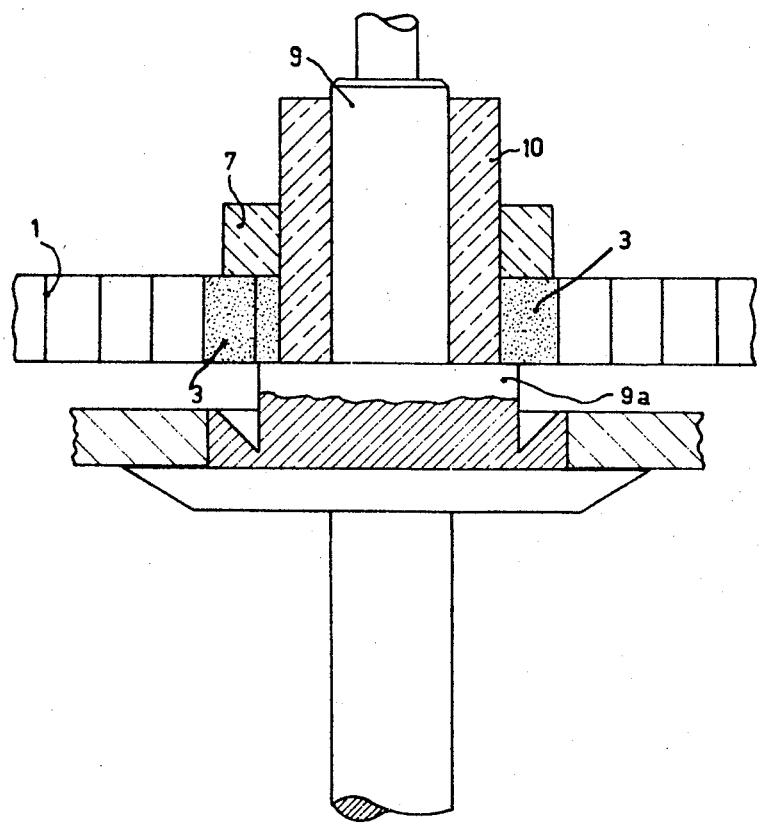

3,396,450
PROCESS FOR MAKING A UNIT CONSISTING OF A TIMEPIECE SPIRAL AND A COLLET
Gabriel Faehndrich, 2824 Vicques, Switzerland, and Marcel Dumont, 10 Chemin du Ble, 2500 Bienne, Switzerland
Filed Mar. 21, 1966, Ser. No. 536,026
Claims priority, application Switzerland, Mar. 19, 1965, 3,883/65; Mar. 23, 1965, 5,692/65
10 Claims. (Cl. 29—178)

ABSTRACT OF THE DISCLOSURE

Process for making a balance spring-collet assembly by securing a coiled balance spring having a blade of a given height, filling the space comprised by about the first one and a half coils of the spring with a liquid metal adhering plastic material; allowing the resin to set so as to form a collet in the form of the coils, piercing an opening in the just formed plastic collet and securing the same on the balance staff by passing the staff through the opening which has been pierced.

---

The invention is concerned with a process for making a unit consisting of a watch making spiral and a collet, in which the collet is formed by a material molded in the centre of the spiral, the interior extremity of the spiral being embedded in this material.

In order to secure the interior extremity of a watch making spiral to the balance staff, there is usually used a collet consisting of a brass crown driven on the staff. The spiral is made rigid with this crown by the tightening, in a common drilling, of its end and of a conical pin, or by glueing in a groove or a slot, which can be in the form of a spiral. The collet is provided with a radial elastic slot permitting its movement on the staff.

Outside this conventional approach, it has already been proposed to mold the collet on the inner end of the spiral. According to this process, the end is introduced in a mold and there is poured therein a material of low density, such as a plastic material which, in the solid state embeds and maintains said interior end of the spiral. The central opening in the collet is formed at the very moment of this molding.

The mold has for this purpose a cylindrical inner rim or of other shape according as to one which is to secure the collet on a staff of cylindrical section or other. By means of this process it is also possible to wind the central opening of the collet thus realised by previously placing in the mold the central ring which adheres to said opening after the unmolding of the collet. By such molding, it is possible to provide on the collet various shoulders exceeding the height of the spiral.

This process however has major drawbacks. These reside principally in the fact that it is necessary to make a mold with extremely accurate dimensions and that the centering of the spiral with respect to the mold constitutes a very delicate operation.

The object of the present invention is to provide a new improved method of making a unit consisting of a watch maker's spiral and a substantially simpler collet.

According to the characteristics to the process of the invention, the central part of the spiral is at least partially filled with a moldable material, for example, a plastic material or a synthetic resin, in such a way as to form a collet in the mass of which is embedded the inner end of the spiral, without having to use a mold.

The melting point of the moldable material preferably will be selected in such a way that the characteristics of the spiral are not modified by heating to this temperature.

Preferably, the centre part of the spiral define approximately by one and one half coils are filled in such a way that the first half coil is completely embedded in the molded material, while the complete coil following the first half coil limits the hub or core formed by the material and in a fashion performs the function of a mold.

This securing device is characterised essentially by the fact that the spiral is guided by its hub, said hub being made rigid on the balance staff by means of at least one hollow cylindrical piece.

Such a device has the advantage of only requiring a lesser manufacturing precision than that necessary for the manufacture of brass collet and permits the elimination of the elastic slot, the hub being sufficiently elastically deformable. It is also no longer necessary to deform the inner end of the spiral in any way, but on the contrary, this end can be embedded in the hub while retaining its natural spiral form free of inner tension.

Other characteristics and advantages of the invention will appear in the description of various embodiments thereof given by way of non limiting example and with respect to the annexed drawing, in which:

FIGURE 4 shows in axial cross-section, a unit according to the invention associated with a cylindrical sleeve for its mounting on the balance staff;

FIGURE 7 is another embodiment of the device for securing the unit on the balance;

Figure 1:
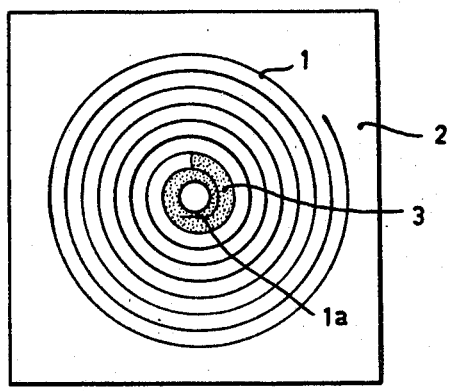
FIGURE 1 is a plan view of a spiral with its molded collet.

According to a first embodiment of the process according to the invention, shown on FIGURE 1, the balance spring or spiral 1 is shown with its inner end 1a bent or crooked as is habitually but not necessarily the case is mounted freely on a work plate 2. The central part defined approximately by one and one half coils, is filled with an epoxy resin such as, for example, "Araldite" (registered trademark) mixed with a hardener, up to a height corresponding to the width of the blade of the spiral. Through a suitable mixing of the resin and of the hardener, one obtains a molded collet 3 having a great resistance and conforming to the shape of the spiral. This molding is then pierced to permit its positioning on the staff.

The central opening in the molded collet can be effected in various ways, for example by molding of the resin around a pin centered with respect to the spiral, which is removed after molding, by piercing or by stamping.

In order to make the hole in the right place, it is possible to proceed variously. One method is shown on FIGURES 2 and 3. Spiral 1 here is centered on work plate 2 by means of three pins 4 arranged in such a way that their positioning corresponds to the pitch of the spiral. It is also possible to use a device such that the first coil stays free and are centered with respect to the geometric centre of the spiral, or to center by optical magnifying means.

There is obtained in this way and very simply a collet of spiral shape perfectly adapted to that of the spiral, a collet the separate manufacture of which would be delicate.

The molded collet thus made being very thin and formed by a material much lighter than brass, a balancing is practically superfluous, however there can be provided during molding a balance hole in the spiral.

The attempts made with various resins, thermo-hardening or some plastic resin such as acetobutyl or acrylic resins, combine with various hardeners, have given very satisfactory results, the adherance of the resin to the metal being sufficient and the resistance high.

Figure 2:
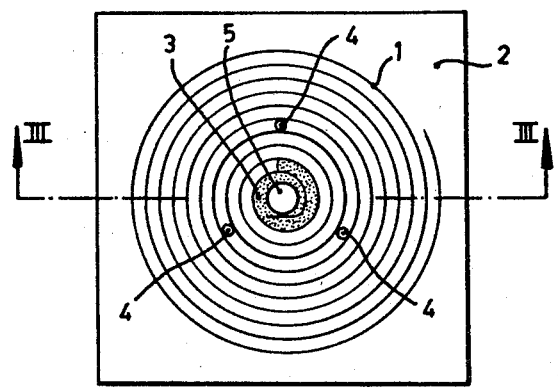
FIGURE 2 shows a centering device for the spiral on its work plate.
Figure 3:
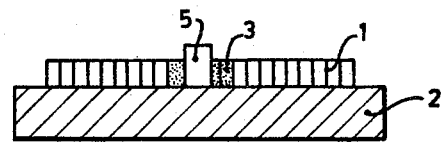
FIGURE 3 is a cross-sectional along lines III—III of FIGURE 2.

In order to improve the horizontal stability of the spiral, the collet can be molded not around a pin giving axial dimensions such as described with respect to FIGURES 2 and 3, but around a ring having a greater height than the thickness of the molded collet. This ring pierced in its center by a cylindrical hole corresponding to the diameter of the balance staff thus ensures a longer adjustment of the collet molded on the staff. This ring can be of any suitable material, such as plastic.

For the same purpose the molded collet can be secured on a washer having a diameter approximately equal to that of the collet and the thickness of which determines the height of the spiral on the staff, height required by the construction of the caliber. This washer can be of any suitable material, such as plastic.

The molded collet can also be maintained on the staff by means of two metal or plastic tightening rings, between which the molded collet would be held and eventually glued to the surfaces of these rings. These rings are preferably driven on the balance staff.

Additionally, the resin used can be colored as desired. It can be made electrically conductive by the addition of metallic powders or by a surface metallising, which may be necessary in the case of certain semielectronic watches.

Instead of a synthetic resin, it is also naturally possible to use all materials capable of being molded at a low temperature, the melting point of the material used being determined by the preservation of the mechanical and drastic characteristics of the spiral.

An improvement in the above indicated securing can be obtained by not fixing the molded hub, serving as a collet, directly on the balance but by means of a tightening canon 10, shown on FIGURE 4. This tightening canon 10 of inexpensive plastic material, such as polyethylene or nylon, is obtained by molding or by profile turning and its bore 6 is of a diameter slightly less to the diameter of the balance staff so as to be secured on this staff (not shown) by elastic deformation. Once mounted on the staff, the canon rests on the balance not shown.

Surrounding the canon, a molded hub 3 for example of synthetic resin, preferably an epoxy resin with a hardener, maintains spiral 1, one coil and a half of which approximately is embedded in the mass of the hub.

The inner diameter of the hub 3 is equal to the outer diameter of canon 10 in such a way that the hub may be introduced on the canon without forcing. If the dimensions of the canon are correctly selected, it is not necessary to glue the two pieces, the securing taking place automatically by the expansion of the canon during its introduction on the balance staff. If the tolerances of the canon are incorrectly selected, it will be of course necessary to secure the hub to the latter by glueing or by material deformation.

Before driving canon 10 on the balance staff, the hub is adjusted to the height described on the canon. It has been supposed that the outer surface of canon 10 was cylindrical, or it may be advantageous that it be prismatic, in which case the hole made in hub 3 being polygonal. There will be avoided thus all unwanted angular displacement of the spiral with respect to the canon, and the polygonal outline of the canon will give a good hold to the tool used to make the canon turn around the staff for the putting into beat.

Figure 5:
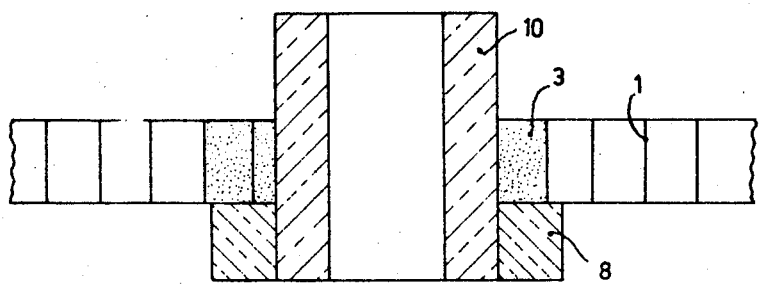
FIGURE 5 shows a modification of FIGURE 4.
Figure 6:
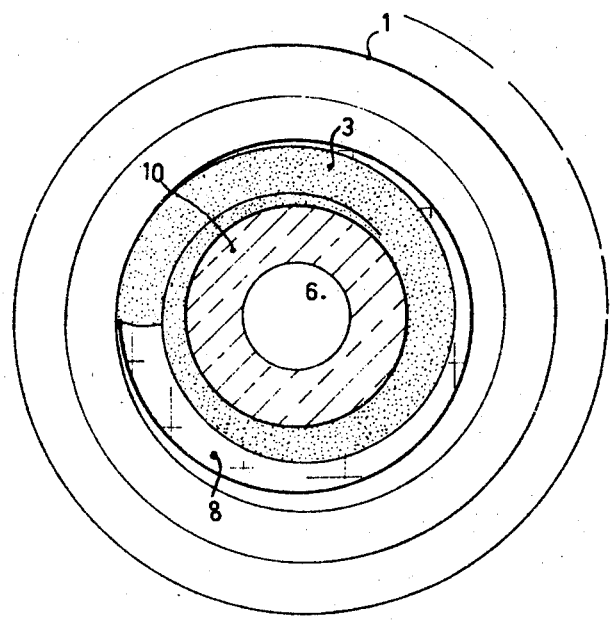
FIGURE 6 is a plan view of the device according to FIGURE 5.

FIGURES 5 and 6 show how the horizontal stability of the spiral may be increased by making hub 3 rest on a washer 8 driven or glued to the lower end of canon 10. The thickness of the washer 8 determines that the working height of the spiral with respect to the balance. For each height required by the characteristics of the caliber, it will suffice then to combine canon with a washer of suitable thickness.

This height naturally can be determined by the balance itself. FIGURE 7 shows a balance 9 having a step or shoulder 9a having this height. Hub 3 rests on this shoulder and moreover is also maintained by washer 7 similar to washer 8 of FIGURE 2 which bears on hub 3.

Figure 8:
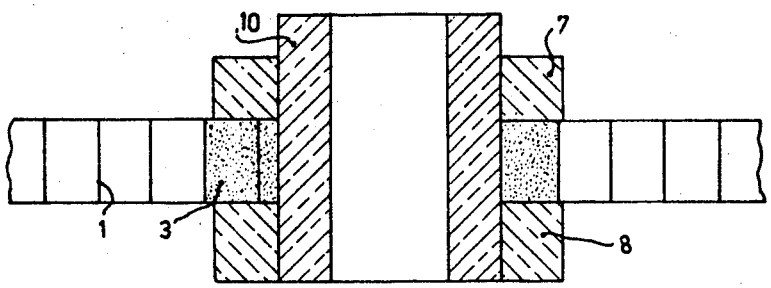
FIGURES 8 to 10 show three other embodiments.

FIGURE 8 shows how the securing washer 7 and the elevation washer 8, these two washers holding hub 3. The three members 10, 7 and 8, all of plastic material, are assembled either by glueing or by driving.

Figure 9:
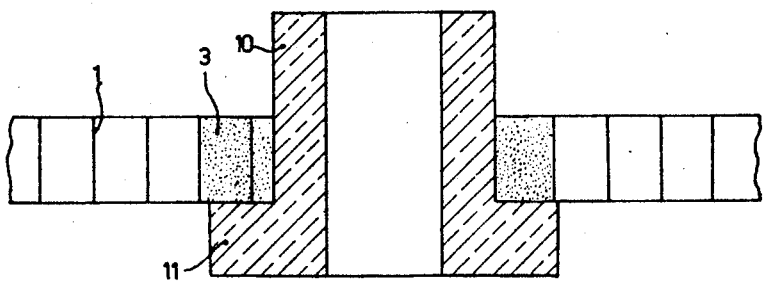

Washer 8 can be replaced by shoulder 11 made with the canon, as shown on FIGURE 9.

Figure 10:
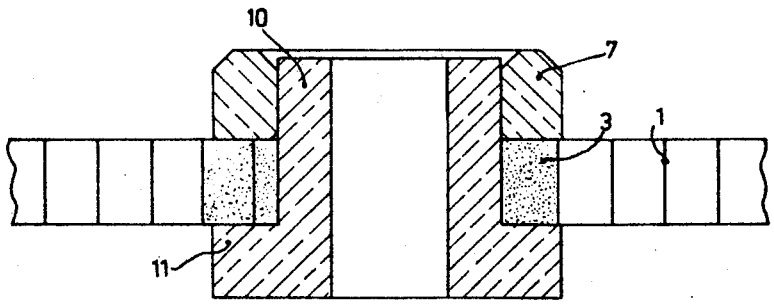

FIGURE 10 shows a canon similar to the preceding one on which is secured a washer 7 ensuring the stability of the spiral, this washer can have a polygonal profile or may have slots in order to facilitate the putting into beat of the spiral-balance assembly.

In all the examples shown, washer 7 can be of polygonal shape or fluted.

The device shown on FIGURE 10 can be mounted inversely, washer 7 serving as a support and determining the height of the spiral with respect to the balance and the shoulder 11 then being preferably not circular or fluted in order to facilitate the placing into beat.

The material forming the canon and the washer can be either metallic or synthetic.

The invention naturally is not limited to the embodiment described but extends to all spiral, collet assemblies obtained by molding a hub.

What is claimed is:

1. Process for making a balance spring-collet assembly comprising securing a metal coiled balance spring having a blade of a given height, and filling the space comprised by approximately the first one-and-one-half coils of said spring with a liquid metal adhering plastic materials; allowing the resin to set so as to form a collet having the shape of said coils; piercing an opening in the thus-formed plastic collet and securing the same on a balance staff by passing said staff through said opening.

2. Process according to claim 1, wherein said plastic material is a material selected from the group of thermosetting and thermoplastic resins having a melting point lower than the temperature at which the metallic properties of said balance spring are impaired.

3. Process according to claim 1, wherein said central opening is provided in said collet by disposing a pin in said space and then pouring said plastic material therearound.

4. Process according to claim 1, wherein said plastic material is mixed with a hardening agent.

5. Process according to claim 1, wherein said resin is an acrylic or lintyl acetate resin.

6. Process according to claim 1, wherein said plastic material contains a conductive metallic powder.

7. Process according to claim 1, wherein said collet is also given a metallizing treatment to render the same conductive.

8. Process according to claim 1, wherein a plastic cannon is passed through said opening in collet and said staff is passed through said cannon for securing said assembly in place.

9. Process according to claim 8, wherein a washer is fitted on said cannon and said collet is caused to rest thereon to increase the horizontal stability of said balance.

10. Process according to claim 8 wherein a second washer is placed around said cannon above said collet.

References Cited

UNITED STATES PATENTS

| | | | |
|---|---|---|---|
| 2,062,627 | 12/1936 | Whitehead | 29—178 X |
| 2,263,484 | 11/1941 | Brendler | 58—140 |
| 2,732,613 | 1/1956 | Renholts | 29—149.5 |
| 3,132,412 | 5/1964 | Kreissig | 264—274 X |

THOMAS H. EAGER, *Primary Examiner.*